Feb. 26, 1935.  E. PIQUEREZ  1,992,631
FLEXIBLE JOINT AND METHOD OF MAKING SAME
Filed Dec. 6, 1932  2 Sheets-Sheet 1

INVENTOR
EMILE PIQUEREZ
BY
Williams, Bradbury, McCleb & Hinkle
ATTORNEYS

Feb. 26, 1935. E. PIQUEREZ 1,992,631
FLEXIBLE JOINT AND METHOD OF MAKING SAME
Filed Dec. 6, 1932 2 Sheets-Sheet 2

INVENTOR
EMILE PIQUEREZ
BY
Williams, Bradbury, McCaleb & Hinkle.
ATTORNEYS

Patented Feb. 26, 1935

1,992,631

UNITED STATES PATENT OFFICE 1,992,631

FLEXIBLE JOINT AND METHOD OF MAKING SAME

Emile Piquerez, Paris, France, assignor, by mesne assignments, to Tecalemit, Limited, Brentford, England, a company of Great Britain Application December 6, 1932, Serial No. 645,927
In France December 10, 1931

7 Claims. (Cl. 29—149.5)

I have made application in France on the 10th December 1931 and in Great Britain on the 23rd September 1932.

The present invention relates to improvements in flexible joints of the type in which a sleeve of flexible material is interposed between two metallic sleeves and is arranged so as to absorb the relative angular displacements of the inner and outer sleeves without moving relatively thereto. The present invention is adapted to be applied to all forms of such joints.

Flexible joints are used to allow the angular displacement of a member about a shaft and, to this end, the internal sleeve of the joint is made integral with the shaft. The external sleeve is made integral with the said member usually by fixing the sleeve with sufficient tightness in the member, the extent of the surfaces in contact allowing perfect fixation. It is much more difficult to fix the internal sleeve, however, and many methods of fixing, more or less efficient, have been proposed.

One object of the present invention, therefore, is to obtain an efficient fixation of the internal sleeve on the member with which it is to be made integral.

Another object of the present invention is to provide a method of mounting a flexible joint so that portions of the internal sleeve which contact with corresponding portions on the member with which it is to be fixed or made integral are so arranged that no slipping can take place between the cooperating contacting surfaces.

Another object of the present invention is to provide means for causing and maintaining the axial locking of the interengaging portions of the internal sleeve and of the member with which it is to be fixed.

A further object of the present invention is to provide means for detachably locking the inner sleeve to the member with which it is to be fixed.

A further object of the present invention is to provide an improved flexible joint having the characteristic feature that at one at least of its extremities, the inner member of the joint comprises a tapered bearing surface which is adapted to engage with a correspondingly tapered face on the member with which it is to be fixed.

A further object of the present invention is to provide an improved flexible joint so arranged that the sleeve of flexible material can be given an initial compression in the radial direction before assembly of the joint to make it capable of enduring oscillations of considerable angular extent.

A further object of the present invention is to provide an improved flexible joint which is simple in construction and capable of being produced very economically.

With the above objects in view, a complete understanding of the invention may be had by reference to the following detailed description taken in conjunction with the accompanying drawings in which.

Referring to the drawings:—

The flexible joint comprises an external metallic sleeve $a$ and an internal sleeve $b$ also of metal, a rubber sleeve $c$ being inserted between the two sleeves. The bore of the internal sleeve is formed at each of its extremities with a conical part $b^1$ which is obtained by expanding by means of a press after the joint has been made. The expansion is carried out by forcing into the inner sleeve a conical mandrel, which opens out the said sleeve and forms a perfectly dimensioned conical part. The conical parts could, however, be provided by turning, but with the disadvantage of diminishing the thickness of the sleeve. On the contrary, the process of expanding the metal does not weaken the sleeve and has the advantage of causing a supplementary grip on the rubber at the ends of the joint, which prevents any relative displacement of the sleeves under the effect of the axial supports.

Figure 1:
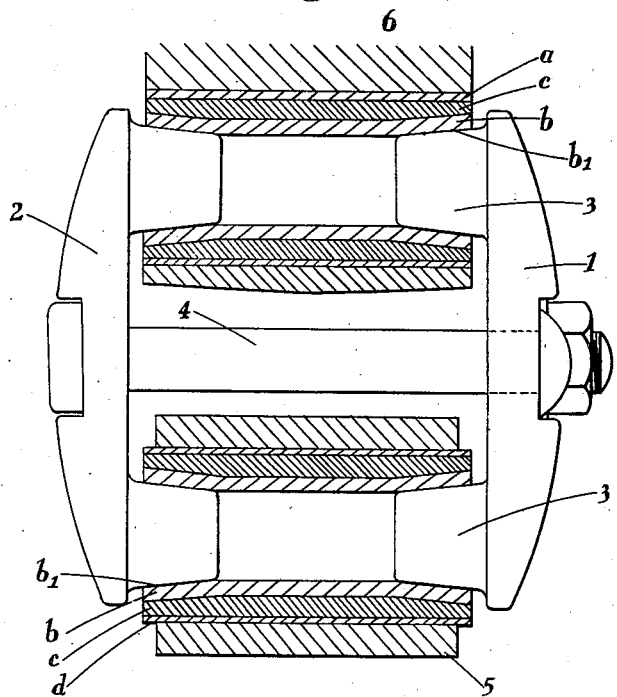
Fig. 1 shows, partly in elevation and partly in section, the application of a flexible joint to a twin shackle of an automobile chassis.

In the construction illustrated in Figure 1, the twin shackles 1 and 2 are each provided with two conical lugs 3, which are adapted to engage in the conical parts $b^1$ of the inner sleeve of the joint. A central bolt 4 allows the twin shackles to be firmly secured together, with the consequent locking of the conical parts in position and the perfect solidity of the two shackles and of the internal sleeves $b$ of the joint. The external sleeves are forced into the members with which they are to co-operate, e. g. the eye of a spring 5 and a member 6 fixed on the chassis of a vehicle.

Figure 2:
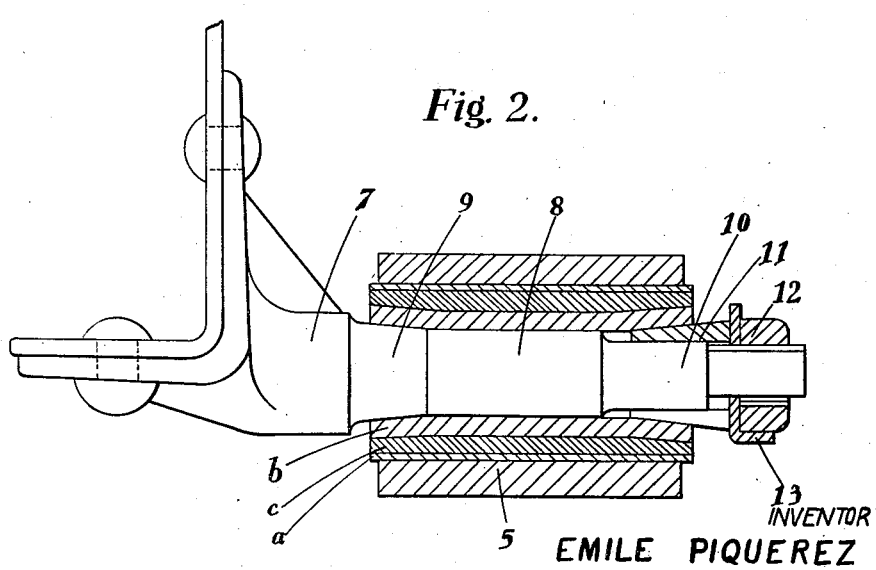
Fig. 2 shows the mounting of a flexible joint on an overhanging axle.

Fig. 2 shows a method of anchoring a spring on to an overhanging axle 7 of a vehicle, the axle being fixed to the chassis. The axle is formed with a cylindrical part 8 and with a conical part 9 on to which one end of the inner sleeve $b$ of the joint is locked. The axle is also formed with a part 10 of smaller diameter, on which is arranged a tapered collar 11. A nut 12 is screwed on to the end of the said axle and forces the collar into wedging engagement with the tapered bore of the inner sleeve $b$. A washer 13 is arranged on the axle and is turned over on to one face of the nut 12, and thus prevents the latter from slackening back. The vehicle spring 5 is mounted on the external sleeve $a$ of the joint, as in the preceding example.

Figure 3:
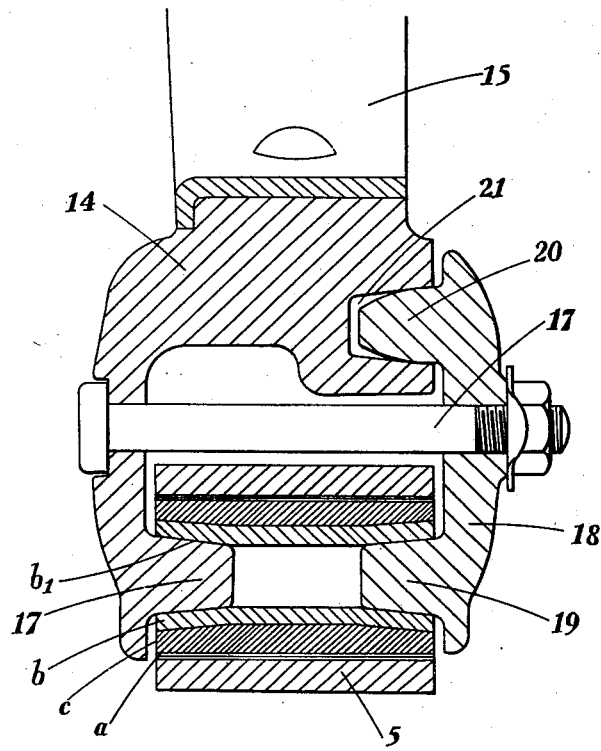
Fig. 3 is a sectional view of the mounting of a flexible joint on a dumb-iron at the front of an automobile chassis.

Figure 3 shows the application of a flexible joint to a dumb-iron at the front of a vehicle chassis. The dumb-iron comprises a box member 14 fixed in the longeron 15 and formed with a side plate 16 having a conical boss 17 on which is arranged the tapered part $b^1$ of the bore of the internal sleeve $b$ of the flexible joint. The latter is secured at its other extremity by means of a side-plate 18 also having a conical boss 19 which engages in the outer conical part of the bore of the sleeve $b$ of the joint. The side-plate 18 is also formed with a tapered boss 20, which engages in a recess 21 provided in the side-plate 16. A bolt $17^1$ secures the side-plates 16 and 18 together and ensures the locking of the complete device. The spring-eye 5 is fitted on to the external sleeve $a$ of the joint.

Numerous other methods of mountings, comprising in the flexible joint conical male parts, conical female parts, a male part and a female part or a single locking part can be employed. The method of assembling of the members to which the flexible joint is applied and their nature or arrangement can obviously be varied. The conical parts could, for example, be fixed on the said members in any manner whatever and the ordinary cylindrical joint could be replaced by a spherical joint.

I claim:—

1. A method of mounting a flexible joint which comprises a metallic hollow outer member, a metallic inner sleeve arranged normally coaxially with said member, and a sleeve of flexible material interposed between said outer member and said inner sleeve and adapted to absorb relative angular movement of said member and said inner sleeve, said method consisting in widening out said inner sleeve at one end so as to form a conical bore and to press against said resilient sleeve, and engaging in said conical bore a correspondingly tapered male portion attached to one of the two parts which are to be connected through said flexible joint.

2. A method of mounting a flexible joint which comprises a metallic hollow outer member, a metallic inner sleeve arranged normally coaxially with said member, and a sleeve of flexible material interposed between said outer member and said inner sleeve and adapted to absorb relative angular movement of said member and said inner sleeve, said method consisting in widening out said inner sleeve at one end so as to form a conical bore and to press against said resilient sleeve, and engaging in said conical bore a correspondingly tapered male portion attached to one of the two parts which are to be connected through said flexible joint and detachably locking said inner sleeve on said tapered male portion.

3. A method of mounting a flexible joint which comprises a metallic outer member, a metallic inner member normally coaxial with said outer member, and a sleeve of flexible material interposed between said members and adapted to absorb relative angular movement of said members, said method comprising initially compressing said sleeve of flexible material in a radial direction between said inner and outer members, forcing the outer member into one of the two parts which are to be connected through said flexible joint, expanding the extremities of said inner member to form conical bores therein and to provide a supplementary grip on the sleeve of flexible material at the ends of the joint, and engaging said bores thus formed with correspondingly tapered portions provided on the other of the two members which are to be connected through said flexible joint.

4. A method of mounting a flexible joint which comprises a metallic outer member, a metallic inner member normally coaxial with said outer member, and a sleeve of flexible material interposed between said members and adapted to absorb relative angular movement of said members, said method comprising initially compressing said sleeve of flexible material in a radial direction between said inner and outer members, forcing the outer member into one of the two parts which are to be connected through said flexible joint, expanding the extremities of said inner member to form conical bores therein and to provide a supplementary grip on the sleeve of flexible material at the ends of the joint, and detachably locking the interengaging tapered members.

5. In the method of mounting a flexible joint which comprises a metallic outer member, a metallic inner member normally coaxial with said outer member, and a sleeve of said flexible material interposed between said members and adapted to absorb relative angular movement of said members, the step of expanding at least one end of the inner member to form a conical bore therein and to provide a supplementary grip on the sleeve of flexible material.

6. A flexible joint comprising a metallic outer member, a metallic inner sleeve normally coaxial with said outer member, a sleeve of flexible material interposed between said member and said inner sleeve, said sleeve of flexible material being adapted to be initially compressed between said member and said inner sleeve, said inner sleeve being adapted to be expanded in portions to further compress portions of said sleeve of flexible material, and means to detachably secure said inner sleeve to one of the two parts which are to be connected through said flexible joint.

7. In a flexible joint, an outer member, an inner member normally coaxial therewith, and a sleeve interposed and compressed therebetween and adapted to absorb relative angular movement of said members, said inner member comprising a sleeve member expanded at at least one end to provide a supplementary grip on the interposed sleeve and to provide an engageable surface for cooperation with a correspondingly shaped surface on one of the two parts which are to be connected through said flexible joint.

EMILE PIQUEREZ.